INVENTOR.
MAXWELL L. CRIPE.
BY
Richard G. Geib
ATTORNEY.

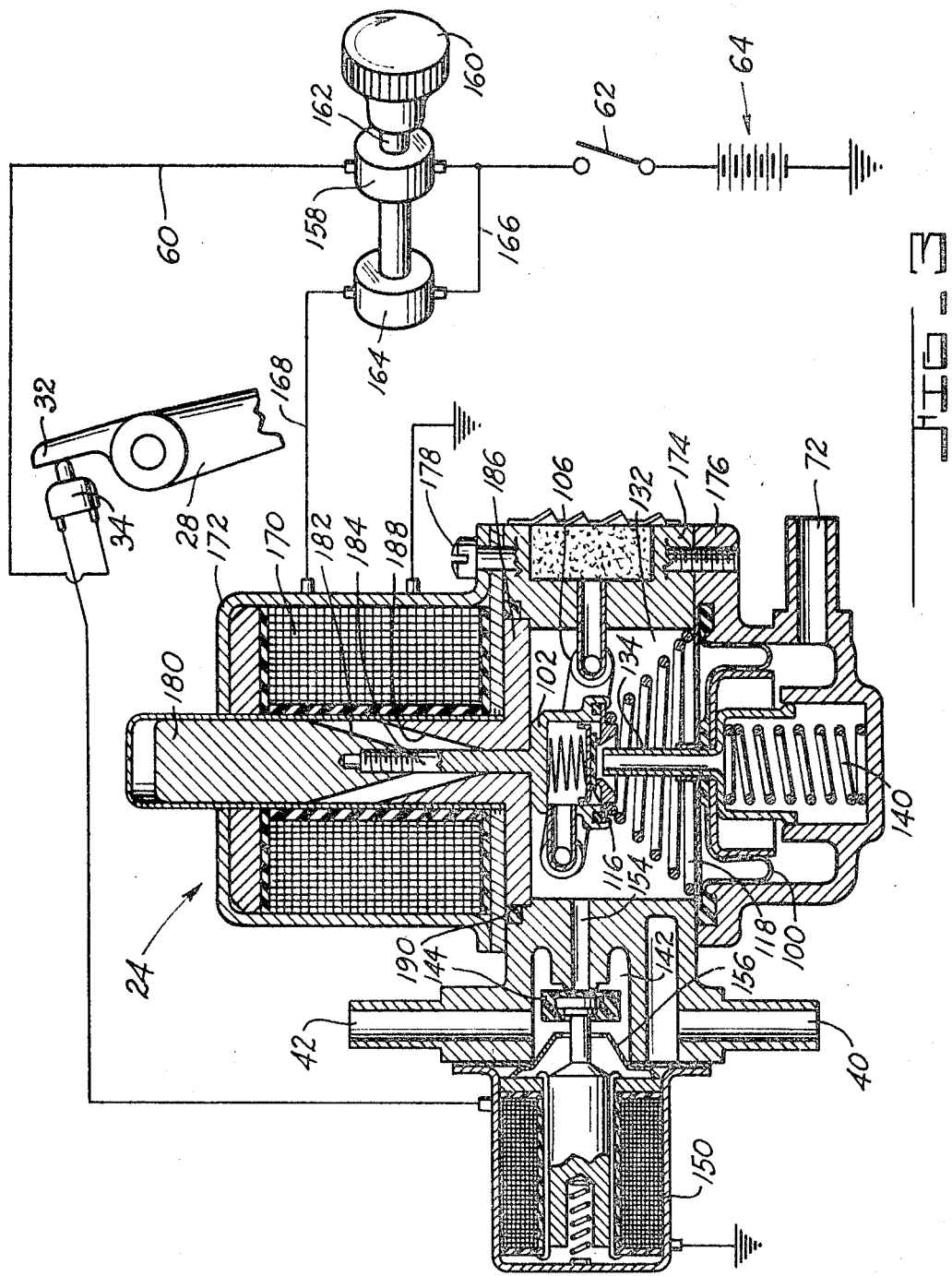

United States Patent Office 3,460,439
Patented Aug. 12, 1969

3,460,439
DUAL CONTROLLED SERVOMOTOR
Maxwell L. Cripe, South Bend, Ind., assignor to The Bendix Corporation, a corporation of Delaware
Filed Feb. 24, 1967, Ser. No. 618,537
Int. Cl. F15b *11/14, 13/044*
U.S. Cl. 91—427                                4 Claims

ABSTRACT OF THE DISCLOSURE

A fluid pressure servomotor having a movable wall controlled by valve means including an internal valve and an external valve controlled remotely by a member connected thereto by a force multiplying means.

SUMMARY

With reference to a power braking system, being one embodiment for the invention, it has been realized that under normal driving conditions with the usual motor vehicle on long trips or in congested traffic, it is necessary for an operator to shift his foot from the accelerator pedal to the brake pedal and vice versa many times, which is tiresome, both physically and mentally. Furthermore, it has been realized that with certain physical handicaps, it is difficult, if not impossible, for a person to own and operate an automobile without extensive modifications to the vehicle control system after its purchase. It is therefore, a principal object of this invention to provide a means to operate a fluid pressure servomotor such as is attendant to power braking systems, by both an operator's hand and/or his foot in order to eliminate the problems aforementioned, as well as others.

RELATED PATENT APPLICATION

This invention is related to a copending patent application Ser. No. 575,639, assigned to the common assignee, now issued as U.S. Patent No. 3,364,918.

DRAWING DESCRIPTION

Figure 1:
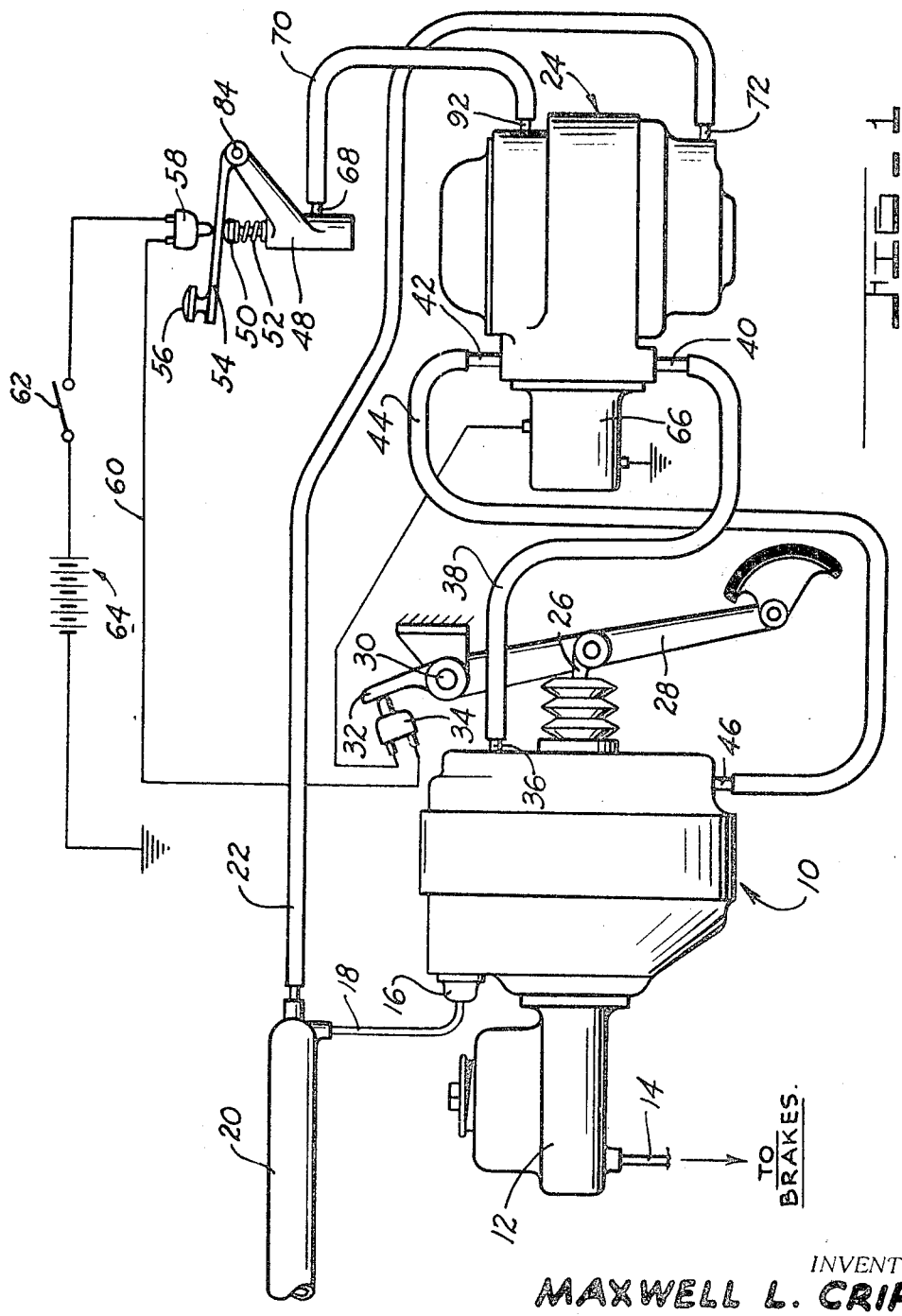
Figure 2:
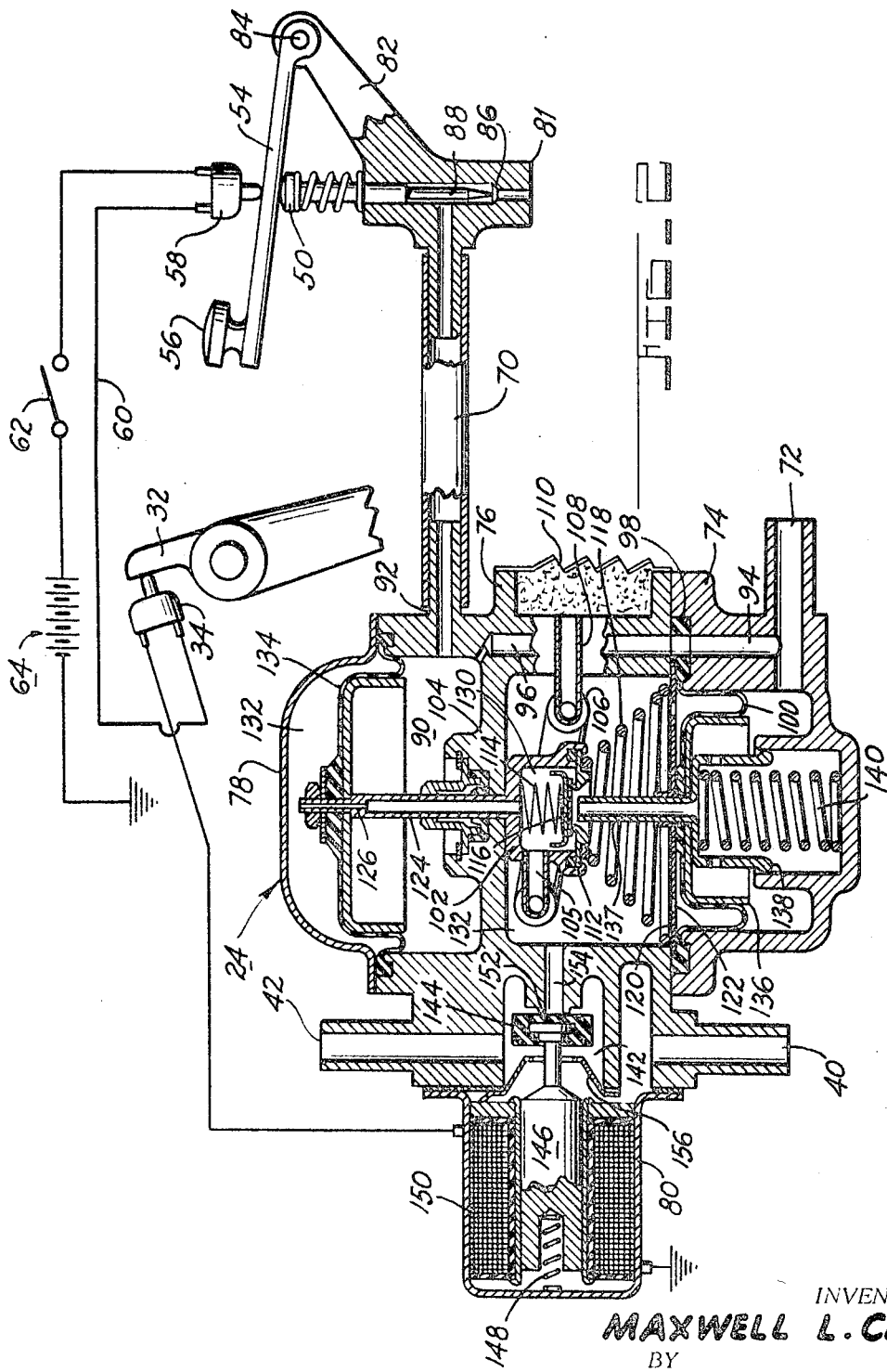

FIGURE 1 is a schematic illustration of a power braking system for a vehicle embodying the features of this invention;

FIGURE 2 is a cross sectional detail of the secondary control valve elements in accordance with the principles of this invention as related, schematically, to the primary control mechanism for the fluid pressure servomotor such as seen in the system of FIGURE 1; and FIGURE 3 is a modification of the secondary control means for the fluid pressure servomotor and its relation, schematically, to the primary control means all in accordance with the principles of this invention.

DETAILED DESCRIPTION

With particular reference now to the schematic illustration of FIGURE 1, there is seen a fluid pressure servomotor 10 including a master cylinder 12 for pressurizing fluid and delivering it by way of a conduit 14 to the vehicle brakes of an automobile. The servomotor 10 is of a pneumatic type being connected via a check valve 16 to a conduit 18 leading from an engine intake manifold 20 of the associated automobile engine. The manifold 20 is also connected by means of the conduit 22 to a secondary control means 24 to be described in greater detail hereinafter. The servomotor is of a type to have a movable wall carrying internally of it a valve mechanism (not shown) connected by means of a push rod 26 to a brake pedal 28 within the operator's compartment of the automobile. A brake pedal 28 is pivoted as at 30 to fixed structure of the automobile and has, in one form visualized thus far, a projecting body 32 that cooperates with a position sensing switch 34.

As may be familiar to those skilled in the art, pneumatic servomotors of the type as have been heretofore visualized, are such as to have the internal valving mechanism located within the movable wall between passages communicating one side of the movable wall to the other and communicating atmospheric pressure centrally of the movable wall to one of the sides of the movable wall aforementioned, namely the control chamber. As will be realized from a study of the companion patent application aforementioned, the only difference between the servomotor herein suggested than those more familiar to those skilled in the art is that the internal valving mechanism does not port directly to the control chamber but rather to an internal conduit that is connected to a control port 36 communicated by means of a conduit 38 to the secondary control valve 24 as at the port 40. The secondary control valve, as will be seen later, is provided with an outlet port 42 connected to a conduit 44 that leads to an inlet port 46 for the control chamber of the servomotor 10.

The secondary control valve 24 is operated by means of a bleed valve 48 having a needle valve type plunger 50 biased by a spring 52 to a normally open position which is regulated by the lever 54 and the button 56 that may be installed in the spokes of a steering wheel, or in view of the recent developments in the art in a twist grip of a steering control.

A position sensing switch 58 is also arranged to sense the control of the lever 54 and is connected in series by means of the electrical lead 60 to the position sensing switch 34 sensitive to the operation of the brake pedal 28. An ignition switch 62 is presently being visualized as interposed between the vehicle storage battery 64 and the position sensing switch 58 for providing a power source for controlling a solenoid 66 of the secondary control valve 24.

The bleed valve 48 is provided with a control port 68 connected by a conduit 70 to the secondary control valve which also has a vacuum inlet port 72 to which the conduit 22 is connected.

With reference now to the particular internal construction of the bleed valve 48 and the secondary control valve 24, the reader's attention is directed to FIGURE 2 showing the secondary control valve to include a vacuum motor and an electrical solenoid for controlling the valve elements therein. More particularly, the secondary control valve 24 is constructed by joining housing portions 74 and 76 with a cap 78 and an enclosure 80 for the solenoid valve. The bleed valve, on the other hand, is essentially comprised of a housing 81 having an ear 82 to which the lever 54 is pivoted by the pin 84. The housing 81 is bored so as to have a valve seat 86 cooperating with a needle valve 88 of the plunger 50 to control the bleeding of vacuum from a vacuum chamber 90 via the conduit 70 that is connected to the housing portions 76 as at the port 92. As may be realized by a comparison of FIGURES 1 and 2, the vacuum from conduit 22 that is created in the intake manifold 20 is communicated via passages 94 and 96 that are mated upon the joining of the housing portions 74 and 76 and sealed with respect to the surrounding atmosphere by means of a peripheral bead 98 of a diaphragm 100 that is assembled between the housing portions 74 and 76.

Prior to the assembly of the housing portion 74 to the housing portion 76, a valve poppet 102 is slidably positioned through an opening in a partition 104 within the housing portion 76, which valve poppet includes a control port 105 that is connected by means of a rubber hose, or the like 106 to a tube 108 leading from an atmosphere inlet 110 through the housing portion 76. A valve poppet 102 comprises a press fitted valve seat 112 that is assembled to the poppet structure after the insertion of a spring 114 and a disc valve 116. After this assembly, a variable rate spring 118 is fitted over the valve seat 112, and a plate 120 having a plurality of radial openings 122 is placed against a shoulder of the housing portion 76 with the diaphragm bead 98 immediately underlying same in the two housing portions 74 and 76 that are thereafter bolted together by bolts (not shown). It should be noted that the valve poppet 102 also includes a hollow stem 124 that has a restricted passage 126 to communicate an atmospheric chamber 130 within the poppet 102 to a chamber 132 within the cap 78 that is separated from the chamber 90 by means of a diaphragm 134 sealing, by means of the peripheral beads thereof, the juncture of the cap 78 with the housing portion 76, that is also accomplished by means of bolts (not shown).

The partition 104 divides the housing portion 76 so as to create a control chamber 132 in which the valve poppet 102 is operable, and which is normally communicated to the vacuum entering the secondary control valve 24 by means of the port 72 via a hollow stem 137 that is affixed to diaphragm support plate 136 of the diaphragm 100. The stem 137 includes a larger diameter afterbody 138 that is slidably associated with a bore within the housing portion 74 and which contains a spring 140 that normally urges the stem 137 upwardly until the diaphragm 100 abuts upon the plate 120.

The housing portion 76 further has a valve chamber 142 within which a plug valve 144 is operatively arranged to be controlled by a core 146 of the solenoid valve 66 biased by means of a spring 148, in absence of an electrical current within the solenoid coil 150, to abut on a valve seat 152 about a passage 154 from the chamber 132. Prior to joining of the solenoid housing 80 to the portion 76 of the secondary control valve, a valve plate 156 is placed to overlie the opening of the control chamber 142 into the solenoid housing 80 so that, normally, fluid is communicated through the portion 76 of the secondary control valve 24 from the port 40 to the port 42 in absence of energization of the solenoid coil 150.

A modification of the secondary control valve 24 is observed in FIGURE 3 wherein like numbers reference like parts, as seen in FIGURE 2.

In this modification a rotary switch 158 is connected to a knob 160 that, as with the button 56, may be placed on the steering mechanism closely available to the hand of the driver of the automobile. The switch 158 is connected by the line 60 to the position sensing switch 34 adapted to be controlled by the projection 32 of the brake pedal 28 so that operation of the primary control valve by means of the break pedal 28 will brake the circuitry between the battery 64 and the solenoid coil 150 so that the plug valve 144 will close off the communication of the passage 154 with the outlet 42 of the secondary control valve 24. As seen, the switch 158 is operated by means of a shaft 162 connected through the switch 158 to also operate the rheostat 164. The rheostat is inserted between electrical leads 166 and 168 leading to a coil 170 of a solenoid enclosed by a housing 172 bolted to housing portion 174 and 176 by means of bolts 178 about the periphery of the valve 24. A core 180 having a tapered face 182 is threaded to a rod 184 projecting from the poppet valve 102. A plate 186 having a tapered bore 188 is placed between the housing 172 and the portion 174 and a seal 190 about the periphery of the plate 186 maintains the integrity of the control chamber 132 after the assembly of the various housing portions.

OPERATION

With regard to the operation of the power brake system, and referencing the construction shown by FIGURES 1 and 2 the driver of the automobile may either depress the brake pedal 28 to operate the internal valve of the servomotor 10 to first terminate the vacuum suspension of the movable wall in the servomotor and thereafter communicate atmospheric pressure entering centrally of the collapsible boot about the push rod 26 to the port 40 and through the valve plate 156 to the port 42 where it is communicated by conduit 44 to the control chamber inlet port 46 to create a pressure differential across the movable wall and thereby cause it to move to pressurize the master cylinder 12 and actuate the brakes via hydraulic pressure through the conduits 14.

During the actuation of the brake pedal 28, the position sensing switch 34 breaks the circuit to the solenoid coil 150 of the solenoid valve 66 so that the secondary control means operated by the button 56 cannot be simultaneously operated to actuate the servomotor 10.

If, however, the driver of the automobile prefers to actuate the brakes by pushing of the button 56 that may be located on the steering wheel of the vehicle, he will depress the needle valve 88 to first close the position sensitive switch 58 and complete the circuit through the position sensing switch 34 to the solenoid 150 whereby the plug valve 144 is removed from the seat 152 and drawn against the valve plate 156 to close off communication of the port 40 with the port 42 of the secondary control valve 24. This will open the control chamber 132 to the port 42 and via the conduit 44 to the control chamber inlet port 46.

As the button 56 is continued in its downward movement, the needle valve 88 will cooperate with the valve seat 86 to restrict the atmospheric air inlet in the bleed valve 80 so that the vacuum chamber 90 will build up a vacuum creating a pressure differential across the diaphragm 134 to move the poppet valve 102 downwardly. This will first cause the abutting of the stem 137 on the disc valve 116 to terminate the vacuum communication from the vacuum port 72 to the control chamber 132. Further differential being created upon the diaphragm 134 forming the vacuum motor of the secondary control valve 24 will cause the unseating of the disc valve 116 from the valve seat 112 whereby atmosphere in the chamber 130 will be introduced to the control chamber 132 and to the port 42 in the secondary control valve where it is fed via the conduit 44 to the control chamber inlet 46 of the servomotor 10 for operation similarly as described with reference to the operation by the brake pedal 28.

With regard to the operation of the aforesaid device, it should be noted that the restricted passage 126 from the atmospheric chamber 130 leading to the atmospheric chamber 132 under the cap 78 will cause incremental or fineness of movement of the movable wall 134 so that there will be no sudden, uncontrollable actuation of the servomotor 10.

With reference now to the operation of the modification shown by FIGURE 3, it will be realized that upon first twisting of knob 160 the switch 158 will complete the circuit via the switch 34 to the solenoid 150 to operate the plug valve 144, as with regard to its operation explained above with reference to FIGURES 1 and 2. Further rotation of the knob 160 will variably energize the coil 170 to create a magnetic field of growing intensity operating upon the core 180 whereby it may be pulled inwardly to operate the valve poppet 102 with regard to the valve stem 134, as explained above. It should be noted that the tapered machining of the surface 182 and tapered boring 188 for the plate 186 will provide for variable position control of the core 180 by the coil 170. In other words, the travel of the core 180 will be controllably related with the current because of shorter flux lines as between the surfaces 182 and 188. As may be appreciated by those skilled in the art it is advisable with the present state of the art to construct the core 180 and the plate 186 of steel to give a desirable flux path for the field created by the coil 170.

The use of a variable rate spring 118 in the secondary control valve for opposing the operation of the poppet 102 has also been found to add materially to the maintenance of control of operation over the secondary control member.

Having fully described two embodiments in which my invention may be utilized, it is now desired to set forth the intended protection sought by the Letters Patent as follows:

1. A power brake system comprising:
   a foot pedal operated fluid pressure servomotor;
   a secondary control for said servomotor and located in a control pressure passage for said servomotor, said secondary control including:
   a hand operated control means,
      a control valve means including first and second valve poppets with said first poppet being operatively related to said control pressure passage in said second poppet so as to shuttle control pressure for said servomotor between one source connected to said control pressure passage and another source connected to said secondary control and controlled by said second poppet,
   means sensitive to the actuation of said hand operated control means to control said first valve poppet to close said one source from said servomotor, and
   force multiplying means operatively connected to said hand operated control means and to said second poppet for controlling the opening of said another source of control pressure to said control pressure passage, and
   a means to override said hand operated control means whenever said foot pedal is actuated to preclude cut-off of said one source from the controlling of said servomotor.

2. The structure of claim 1 wherein said force multiplying means is characterized as a vacuum operated motor.

3. The structure of claim 2 wherein said hand control means comprises a bleed valve actuatable by a member normally biased by a spring to maintain said bleed valve open, said bleed valve being connected to said vacuum operated motor by a conduit.

4. The structure of claim 1 wherein said force multiplying means is characterized as a variable pull solenoid.

References Cited

UNITED STATES PATENTS

| | | | |
|---|---|---|---|
| 2,657,673 | 11/1953 | Littlefield | 91—459 |
| 3,094,132 | 6/1963 | Byloff | 91—47 |
| 3,150,856 | 9/1964 | Deibel | 60—60 |
| 3,362,298 | 1/1968 | Julow | 91—459 |
| 3,364,818 | 1/1968 | Hager | 91—376 |
| 3,371,484 | 3/1968 | Julow | 91—376 |
| 3,373,661 | 3/1968 | Reichard | 91—459 |

PAUL E. MASLOUSKY, Primary Examiner

U.S. Cl. X.R.

91—32, 448, 459, 461